United States Patent
Leonessa et al.

(10) Patent No.: US 9,086,274 B2
(45) Date of Patent: Jul. 21, 2015

(54) POOL CLEANER WITH LASER RANGE FINDER SYSTEM AND METHOD

(71) Applicants: Alexander Leonessa, Blacksburg, VA (US); Christopher H. Cain, Blacksburg, VA (US); Brian J. Boothe, Raleigh, NC (US)

(72) Inventors: Alexander Leonessa, Blacksburg, VA (US); Christopher H. Cain, Blacksburg, VA (US); Brian J. Boothe, Raleigh, NC (US)

(73) Assignees: Pentair Water Pool and Spa, Inc., Sanford, NC (US); Virginia Tech Intellectual Properties, Inc., Blacksburg, VA (US)

( * ) Notice: Subject to any disclaimer, the term of this patent is extended or adjusted under 35 U.S.C. 154(b) by 68 days.

(21) Appl. No.: 13/929,715

(22) Filed: Jun. 27, 2013

(65) Prior Publication Data
US 2014/0009748 A1    Jan. 9, 2014

Related U.S. Application Data

(60) Provisional application No. 61/664,945, filed on Jun. 27, 2012.

(51) Int. Cl.
*G01C 3/08* (2006.01)
*G01C 15/00* (2006.01)
*E04H 4/16* (2006.01)

(52) U.S. Cl.
CPC ............. *G01C 3/08* (2013.01); *E04H 4/1654* (2013.01); *G01C 15/002* (2013.01)

(58) Field of Classification Search
CPC ......... B60W 30/00; G06K 9/00; G06F 19/00; G05B 15/00
USPC ................................. 356/3.01–28.5
See application file for complete search history.

(56) References Cited

U.S. PATENT DOCUMENTS

| | | |
|---|---|---|
| 3,845,291 A | 10/1974 | Portyrata |
| 3,980,891 A | 9/1976 | Slaker |
| 4,196,648 A | 4/1980 | Jones et al. |
| 4,198,164 A | 4/1980 | Cantor |
| 4,277,707 A | 7/1981 | Silver et al. |
| 4,616,298 A | 10/1986 | Bolson |
| 4,700,427 A | 10/1987 | Knepper |
| 4,705,395 A | 11/1987 | Hageniers |
| 4,745,290 A | 5/1988 | Frankel et al. |
| 4,760,269 A * | 7/1988 | McKenna ............... 250/559.38 |
| 4,775,235 A | 10/1988 | Hecker et al. |
| 4,878,754 A | 11/1989 | Homma et al. |
| 4,920,465 A | 4/1990 | Sargent |

(Continued)

FOREIGN PATENT DOCUMENTS

EP         2246763 A2    11/2010

*Primary Examiner* — Luke Ratcliffe
(74) *Attorney, Agent, or Firm* — Quarles & Brady LLP

(57) ABSTRACT

Embodiments of the invention provide a pool cleaner control system including a laser range finder with a first laser line generator, a second laser line generator, and a camera. The first laser line generator and the second laser line generator are positioned to emit parallel laser lines and the camera is positioned to capture an image of the laser lines projected on an object. The control system also includes a controller in communication with the laser range finder and configured to control operation of the laser line generators to emit the laser lines and to control the camera to capture the image. The controller is also configured to receive the image from the camera, calculate a pixel distance between the laser lines in the image, and calculate the physical distance between the camera and the object based on the pixel distance.

13 Claims, 11 Drawing Sheets

(56) References Cited

U.S. PATENT DOCUMENTS

| | | | |
|---|---|---|---|
| 5,024,529 A * | 6/1991 | Svetkoff et al. | 356/608 |
| 5,113,080 A | 5/1992 | Leu et al. | |
| 5,313,261 A | 5/1994 | Leatham et al. | |
| 5,337,434 A | 8/1994 | Erlich | |
| 5,414,268 A | 5/1995 | McGee | |
| 5,475,207 A | 12/1995 | Bobba et al. | |
| 5,523,844 A | 6/1996 | Hasegawa et al. | |
| 5,569,371 A | 10/1996 | Perling | |
| 5,705,802 A | 1/1998 | Bobba et al. | |
| 5,837,988 A | 11/1998 | Bobba et al. | |
| 5,852,984 A | 12/1998 | Matsuyama et al. | |
| 5,929,984 A | 7/1999 | Hamar | |
| 6,152,704 A | 11/2000 | Aboul-Hosn et al. | |
| 6,758,226 B2 | 7/2004 | Porat | |
| 6,805,458 B2 | 10/2004 | Schindler et al. | |
| 6,876,392 B1 | 4/2005 | Uomori et al. | |
| 7,054,716 B2 | 5/2006 | McKee et al. | |
| 7,573,402 B2 | 8/2009 | Herbert et al. | |
| 7,680,339 B2 | 3/2010 | Tojo | |
| 7,791,235 B2 | 9/2010 | Kern et al. | |
| 7,849,547 B2 | 12/2010 | Erlich et al. | |
| 7,864,342 B2 | 1/2011 | Weiss et al. | |
| 2001/0050093 A1 | 12/2001 | Porat | |
| 2003/0057365 A1 | 3/2003 | Bennett et al. | |
| 2009/0307854 A1 | 12/2009 | Garti | |
| 2011/0064626 A1 | 3/2011 | Kennedy | |
| 2012/0006352 A1 | 1/2012 | Holappa et al. | |
| 2012/0083982 A1 * | 4/2012 | Bonefas et al. | 701/70 |

* cited by examiner

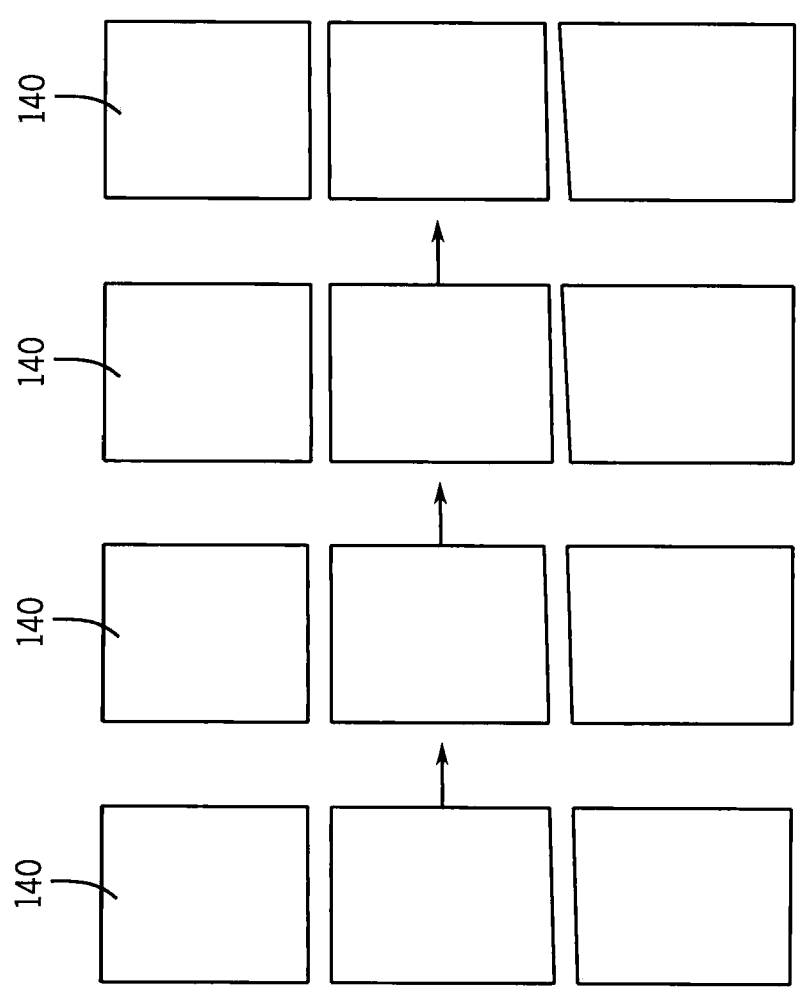

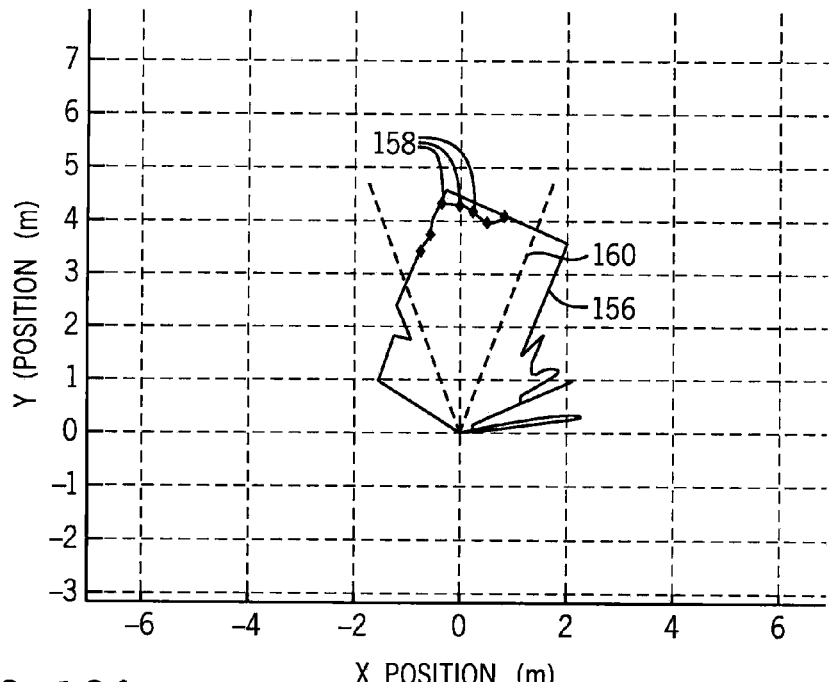
FIG. 12A —LIDAR ◆—LASER ---CAMERA VIEWING ANGLE
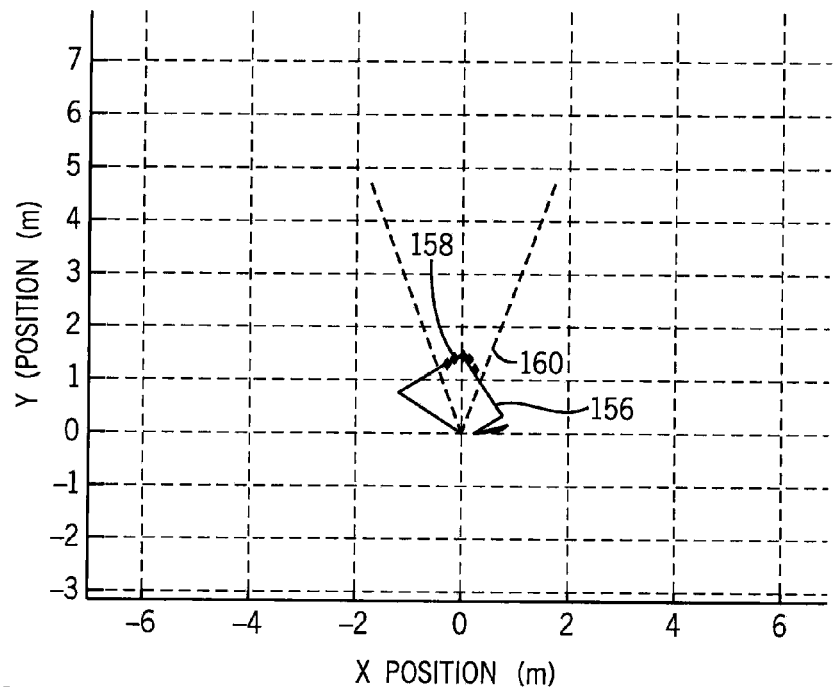
FIG. 12B —LIDAR ◆—LASER ---CAMERA VIEWING ANGLE — LASER RANGEFINDER  --- EXTRACTED LINE 2
--- EXTRACTED LINE 1  O DETECTED CORNER

POOL CLEANER WITH LASER RANGE FINDER SYSTEM AND METHOD

RELATED APPLICATIONS

This application claims priority under 35 U.S.C. §119 to U.S. Provisional Patent Application No. 61/664,945 filed on Jun. 27, 2012, the entire contents of which is incorporated herein by reference.

BACKGROUND

In order for unmanned vehicles to be truly autonomous, they must possess the ability to localize themselves when placed into an unknown environment and learn about the physical objects that surround them. For example, such vehicles learn information for high level applications such as mapping and vehicle localization as well as low level applications such as obstacle avoidance. Once a vehicle learns such information about the environment in which it is working, it is able to move about the environment freely and in an optimized pattern to fulfill its required tasks while staying out of harm's way. While various sensors have been developed for vehicles operating out of the water, the number of sensors available for use by underwater vehicles is limited.

For example, for vehicles working in outdoor environments, localization can be accomplished using satellite-based localization sensors (e.g., GPS sensors) capable of providing accuracy in the centimeter range. Also, laser-based range finders, including Light Detection and Ranging (LiDAR) sensors, are capable of providing vehicle information about the surrounding environment with millimeter accuracy. LiDAR sensors, however, have a high cost that is prohibitive for low budget applications and both LiDAR and satellite-based sensors do not function properly in indoor (i.e., enclosed) or underwater environments.

In underwater environments, the most common sensor technologies are based on acoustics. For example, Sound Navigation and Ranging (SONAR) can provide accurate sensor data for vehicles operating in large open water environments. However, in enclosed underwater spaces, such as swimming pools, acoustic based solutions such as SONAR are difficult to use due to the high number of multiple returns caused by reflections in the enclosed environment. As a result, some laser-based approaches have been proposed. For example, one approach includes a vehicle with a laser pointer projecting a single dot and a camera that visualizes the dot reflecting off of a wall of the enclosed space. Because of this design, such vehicles are only able to determine distance information related to a single location directly in front of the camera. Also, such designs rely heavily on calibration routines that map the laser pointer's location in an image frame with a distance. Another approach includes the use of a single laser line and camera to generate full 3D maps of underwater objects. However, it can be challenging to find the entire laser line in environments that are not extremely dark. As a result, this approach cannot be used in operating environments where large amounts of natural and artificial light may be present, such as swimming pool and spa environments.

SUMMARY

Some embodiments of the invention provide a pool cleaner control system to detect a physical distance to an object in front of the pool cleaner. The control system includes a laser range finder with a first laser line generator, a second laser line generator, and a camera. The first laser line generator and the second laser line generator are positioned to emit parallel laser lines and the camera is positioned relative to the first laser line generator and the second laser line generator to capture an image of the laser lines projected on the object. The control system also includes a controller in communication with the laser range finder and configured to control operation of the first laser line generator and the second laser line generator to emit the laser lines and to control the camera to capture the image of the laser lines projected on the object. The controller is also configured to receive the image from the camera, calculate a pixel distance between the laser lines in the image, and calculate the physical distance between the camera and the object based on the pixel distance.

Some embodiments of the invention provide an autonomous robotic pool cleaner for an underwater environment. The pool cleaner includes a range finder configured to emit first and second lines and detect a projection of the first and second lines on a feature of the environment, a camera configured to capture images of a floor surface of the environment under the pool cleaner, and a controller in communication with the range finder and the camera. The controller is configured to determine a physical distance between the range finder and the feature based on the detected projection of the first and second lines on the feature, determine visual odometry data based on the captured images, map the environment based on the physical distance and the visual odometry data, and track a position of the pool cleaner within the environment.

Some embodiments of the invention provide a method of determining a distance to an object in an underwater environment using a dual-plane laser range finder. The method includes projecting a first line onto the object, projecting a second line onto the object parallel to the first line, and capturing an image of the projected first line and the projected second line on the object. The method also includes segmenting the image into separate image segments and, for each image segment, extracting color planes in the image segment to obtain a grayscale image segment, detecting potential line edges in the grayscale image segment, extracting line segments using the potential line edges, and grouping the line segments to obtain the first projected line and the second projected line in the grayscale image segment. The method further includes, for each image segment, calculating a pixel distance between the first projected line and the second projected line in the grayscale image segment and calculating the distance to the object based on the pixel distance.

DESCRIPTION OF THE DRAWINGS

FIGS. 11A-11D are illustrations of image segments processed according to the process of FIG. 8.

FIGS. 12A and 12B are graphical views of distance measurements determined using the process of FIG. 8.

DETAILED DESCRIPTION

Figure 1:
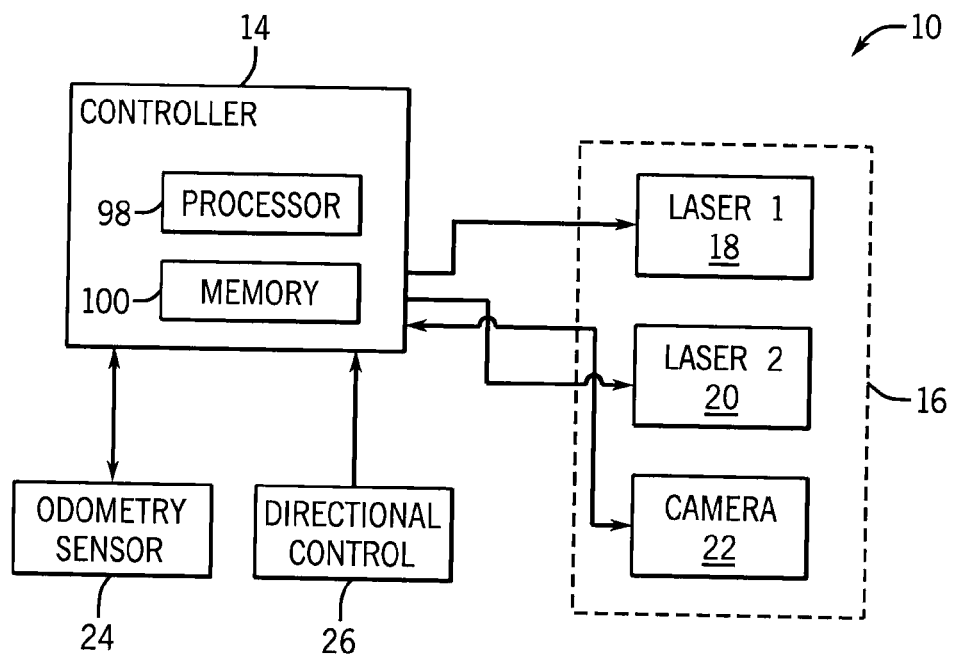
FIG. 1 is a block diagram of a control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention provide a small, low-cost, underwater vehicle for operation in enclosed underwater spaces. More specifically, embodiments of the invention provide a low-cost distance-measuring and mapping system for an autonomous robotic pool cleaner for operation in swimming pool and/or spa environments. The distance-measuring portion of the system is based upon a camera and parallel laser line setup and the mapping portion of the system allows for mapping of a swimming pool environment without previous calibration, using simultaneous localization and mapping (SLAM) techniques, in order to map cleaning routes through the swimming pool environment. This allows the pool cleaner to optimize cleaning routes, for example, in order to traverse and clean the entire swimming pool environment.

Figure 2:
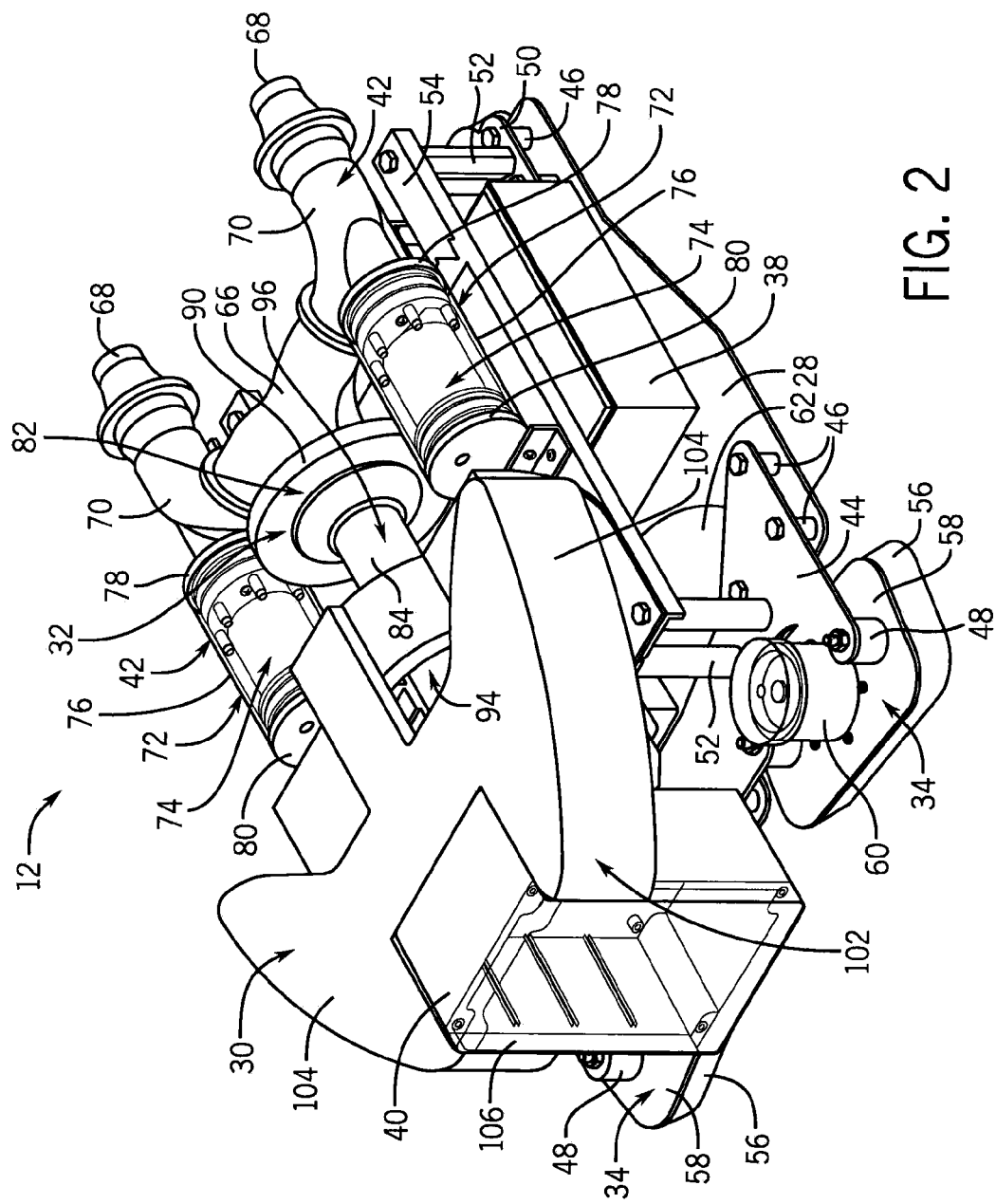
FIG. 2 is a front perspective view of a pool cleaner according to one embodiment of the invention.
Figure 3:
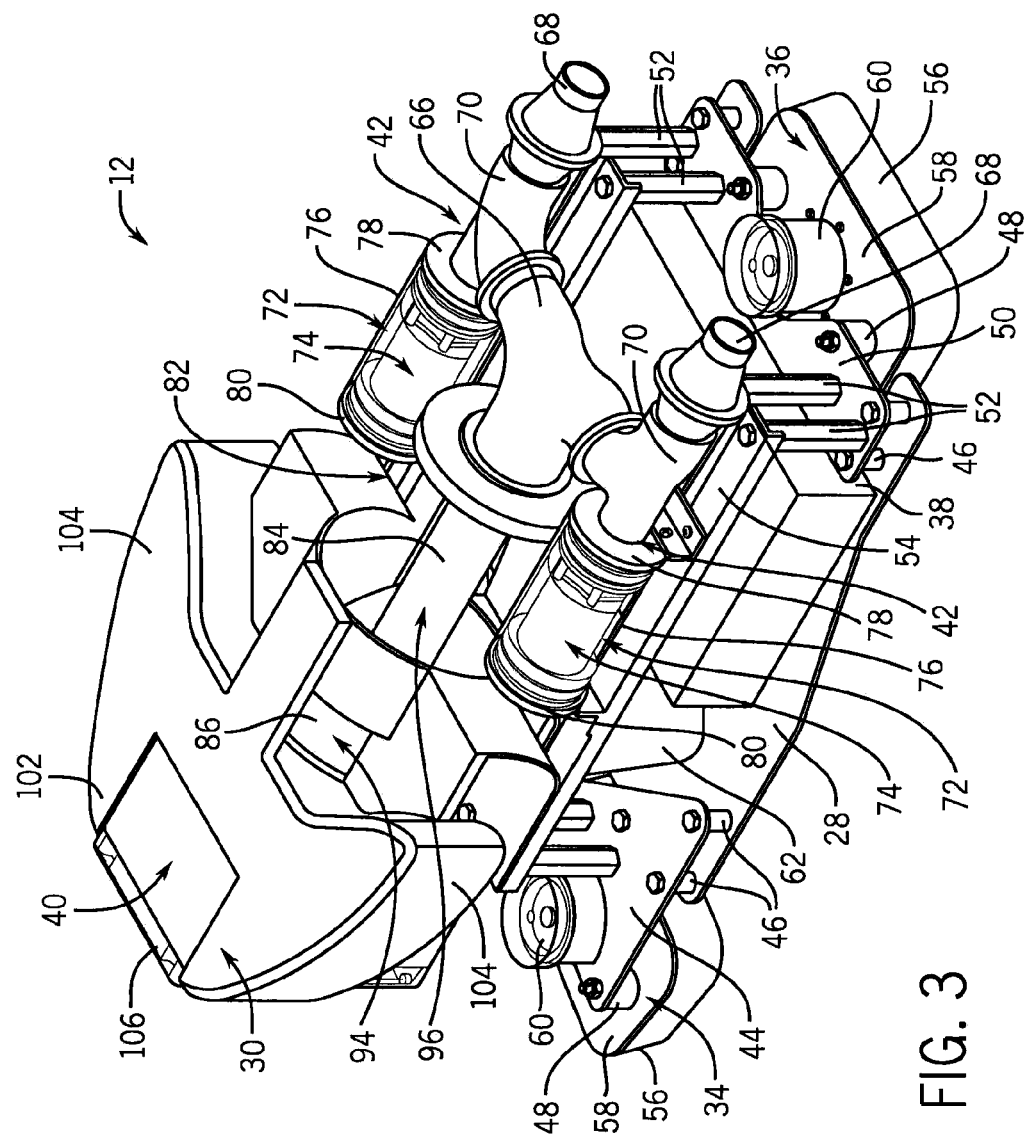
FIG. 3 is a rear perspective view of the pool cleaner of FIG. 2.
Figure 4:
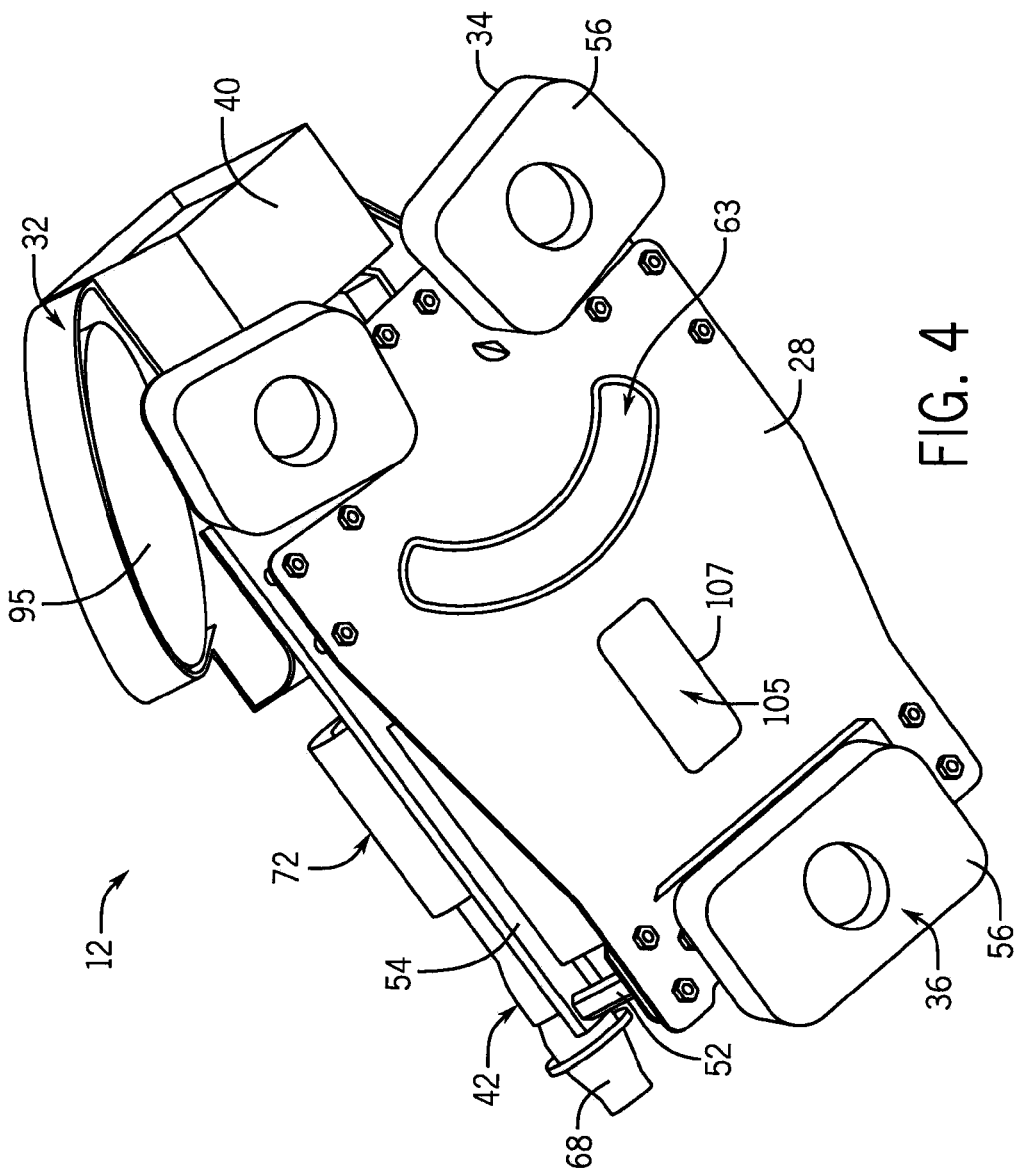
FIG. 4 is an underside perspective view of the pool cleaner of FIG. 2.

FIG. 1 illustrates a control system 10, according to one embodiment of the invention, for an autonomous robotic pool cleaner, such as the pool cleaner 12 illustrated in FIGS. 2-4. The control system 10 can include a controller 14, a first sensor assembly or laser range finder 16 including a first laser 18, a second laser 20, and a camera 22, a second sensor assembly 24, and a directional control mechanism 26. The control system 10 can be located on and/or within the pool cleaner 12 and can optimize operation of the pool cleaner 12 by mapping a swimming pool or spa environment and accurately positioning the pool cleaner 12 throughout the environment. Furthermore, the control system 10 can optimize cleaning routes and identify specific locations of debris within the environment. Generally, the controller 14 can operate and receive inputs from the laser range finder 16 and/or the second sensor assembly 24 and can operate the directional control mechanism 26 to move the pool cleaner 12 along a desired route within the underwater environment based on these inputs, as further described below.

FIGS. 2-4 illustrate an autonomous robotic pool cleaner 12, according to one embodiment of the invention, capable of being operated by the control system 10. The pool cleaner 12 can include a chassis 28, a skimmer assembly 30, a filter assembly 32, front scrubber assemblies 34, a rear scrubber assembly 36 (as shown in FIG. 3), an electronics box 38, a sensor box 40, and outlet nozzle assemblies 42. The electronics box 38 can be coupled to and supported on the chassis 28. Front scrubber plates 44 can each be coupled to the chassis 28 via fasteners 46, and each of the front scrubber assemblies 34 can be coupled to a respective front scrubber plate 44 via fasteners 48. In addition, a rear scrubber plate 50 can be coupled to the chassis 28 via fasteners 46, and the rear scrubber assembly 36 can be coupled to the rear scrubber plate 50 via fasteners 48. Risers 52 can be coupled to each of the front scrubber plates 44 and the rear scrubber plate 50, and I-rails 54 can connect opposing pairs of risers 52 on the scrubber plates 44, 50, as shown in FIGS. 2 and 3. The I-rails 54 can be coupled to and support the skimmer assembly 30 and the filter assembly 32 as well as the outlet nozzle assemblies 42. With reference to the control system 10 of FIG. 1, in some embodiments, the sensor box 40 can house the laser range finder 16, the electronics box 38 can house the controller 14 and/or the second sensor assembly 24, and the front and rear scrubber assemblies 34, 36 and the outlet nozzle assemblies 42 can act as the directional control mechanism 26.

In some embodiments, the pool cleaner 12 can be supported on a surface, such as a swimming pool floor, by the scrubber assemblies 34, 36. The pool cleaner 12 can move itself across the pool floor through operation of the scrubber assemblies 34, 36 and/or the outlet nozzle assemblies 42. More specifically, each scrubber assembly 34, 36 can include a brush 56 attached to a brush plate 58. A vibration motor 60 can be mounted on each brush plate 58 to vibrate the respective scrubber assembly 34, 36, and vibration of the scrubber assemblies 34, 36 can facilitate forward and/or turning movement of the pool cleaner 12 as well as scrubbing action of the brushes 56 against the pool floor. For example, each of the scrubber assemblies 34, 36 can be vibrated at a substantially equal intensity to facilitate forward movement of the pool cleaner 12, and the vibration intensity of each vibration motor 60 can be adjusted individually to facilitate turning movement of the pool cleaner 12 (e.g., the front left vibration motor intensity can be reduced or turned off and the front right vibration motor can be increased or maintained to facilitate a left turn and vice versa). In addition, the outlet nozzle assemblies 42 can force water outward from a rear of the pool cleaner 12 in order to assist forward and/or turning movement of the pool cleaner 12. As further described below, the force and/or amount of water exiting the outlet nozzle assemblies can be adjusted individually to assist forward or turning movement of the pool cleaner 12.

The scrubber assemblies 34, 36 can be coupled relative to the chassis 28 to provide a clearance between the pool floor and the chassis 28. This clearance can be high enough to allow the pool cleaner 12 to travel over debris on the pool floor and low enough to achieve adequate suction of such debris through an intake port 63 of the chassis 28, as shown in FIG. 4, and into the filter assembly 32 via an intake plenum 62 (and, in some embodiments, a connected intake riser, not shown) fluidly connecting the intake port 63 and the filter assembly 32. This suction can be achieved through operation of the outlet nozzle assemblies 42, which create a fluid movement path from the intake port 63, through the intake plenum 62, the intake riser, the filter assembly 32, a center duct 66, and the outlet nozzle assemblies 42. More specifically, the outlet nozzle assemblies 42 can provide the suction force to vacuum water and debris through the intake port 63 and into the filter assembly 32, and to further draw water through the filter assembly 32 and out the outlet nozzle assemblies 42 to assist with propulsion of the pool cleaner 12, as described above.

The outlet nozzle assemblies 42 can each include an outlet nozzle 68, a nozzle duct 70, and a motor vessel 72 in communication with the nozzle duct 70. The nozzle ducts 70 can be coupled to the center duct 66, as shown in FIGS. 2 and 3. Each motor vessel 72 can include a motor 74 housed by a tube 76, a front cap 78, and a rear cap 80. A shaft (not shown) of the motor 74 can extend through the front cap 78 and into the nozzle duct 70, and a propeller (not shown) can be coupled to an end of the shaft inside the nozzle duct 70. Operation of each motor 74 can cause rotation of the propeller and, as a result, provide the motive force to draw water through the fluid movement path described above. In addition, the speed of the motors 74 can be individually adjusted to facilitate turning movement of the pool cleaner 12 (e.g., by providing more forceful ejection of water out of one of the outlet nozzle assemblies 42).

In some embodiments, the filter assembly 32 can include a housing 82, a filter tube 84, a diverter 86, a first end cap (not shown), and a second end cap 90. The housing 82 can include a first suction port (not shown) in fluid communication with the intake riser and the intake plenum 62 to receive water and debris from the underside of the pool cleaner 12 and a second suction port 94 to receive water and debris near the skimmer assembly 30, as further described below. The first end cap can be coupled to a first end of the housing 82 to enclose an internal space 96 of the housing 82. In addition, the first end cap can be coupled to a front filter bracket (not shown), which can be further coupled to one or more of the I-rails 54 to support the filter assembly 32. The filter tube 84 can be a cylindrical tube positioned within the internal space 96 of the housing 82 and can include a filter media that separates the internal space 96 of the housing 82 from an internal space of the filter tube 84. The filter media can permit passage of water from the internal space 96 of the housing 82 to the internal space of the filter tube 84. In addition, the second end cap 90 can be coupled to the housing 82 and the center duct 66. The second end cap 90 can enclose the internal space 96 of the housing 82 and can include a center hole to permit fluid communication between the internal space of the filter tube 84 and the center duct 66. As a result, debris can be retained within the housing 82 while water can pass through the filter tube 84, into the center duct 66, and out of the pool cleaner 12 via the nozzle ducts 70 and the outlet nozzles 68.

The diverter 86 of the filter assembly 32 can selectively close the first suction port, as shown in FIGS. 2 and 3, or the second suction port 94. More specifically, the diverter 86 can be rotated or positioned to selectively close the second suction port 94 while allowing the first suction port to remain open (e.g., when rotated to a first, or "floor operation," position) or to close the first suction port while allowing the second suction port 94 to remain open (e.g., when rotated to a second, or "skimming operation," position). Rotation of the diverter 86 can be accomplished manually or automatically. For example, in one embodiment, a rotation piece (not shown) can be positioned outside of the filter assembly 32, such as on the front cap 78, and can extend through the front cap 78 for connection with the diverter 86. In this configuration, a user can manually rotate the rotation piece in order to adjust the diverter 86 to the first position or the second position. In another embodiment, a servomotor (not shown) can be coupled to the diverter 86. The controller 14, or a separate controller of the pool cleaner 12, can be connected to and can control the servomotor to automatically rotate the diverter 86 to the first position or the second position.

Figure 5:
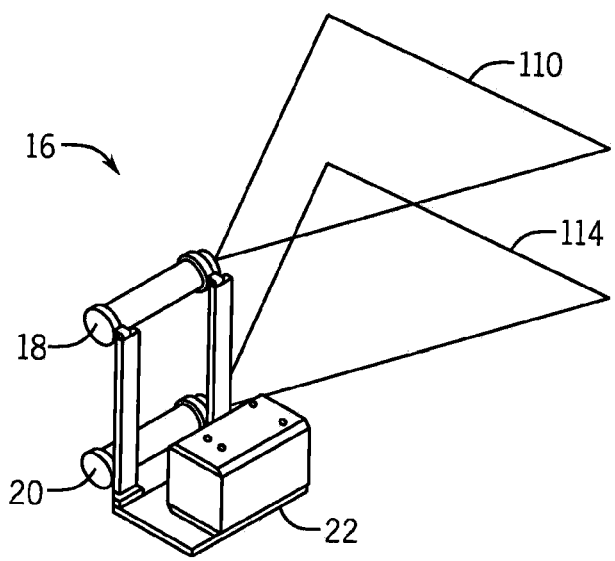
FIG. 5 is a schematic view of a dual-plane laser range finder according to one embodiment of the invention.

When the diverter 86 is rotated to the first position, the pool cleaner 12 can vacuum water and debris near the underside of the pool cleaner 12 (i.e., along the pool floor) as it travels along the pool floor, thus providing a floor cleaning operation. In the second position, the pool cleaner 12 can vacuum water and debris near the skimmer assembly 30, for example as the pool cleaner 12 travels across a surface of the swimming pool, thus providing a skimming operation. More specifically, the skimmer assembly 30 can include inflatable bladders 95 (as shown in FIG. 5), and the bladders 95 can be inflated to allow the pool cleaner 12 to float to the swimming pool surface. When the bladders are inflated to enable the skimming operation, the diverter 86 can be rotated to the second position to permit opening of the second suction port 94. In addition, as shown in FIGS. 2-3, the skimmer assembly 30 can be shaped with a substantially round front nose 102 and left and right wings 104 that extend past and then curve back toward the second suction port 94. This structural configuration of the skimmer assembly 30 can facilitate movement of water and debris to follow the outer edges of the wings 104, thereby causing the debris and water to curve back into the second suction port 94 during forward movement of the pool cleaner 12.

Referring back to the electronics box 38 of the pool cleaner 12, in some embodiments, the electronics box 38 can include electronic components necessary to power and operate the pool cleaner 12. Such electronics can include, but are not limited to, one or more power sources (e.g., batteries) and one or more controllers (such as the controller 14 of FIG. 1) configured to control operation of the vibration motors 60, the motors 74 of each outlet nozzle assembly 42, and the sensor assemblies 16, 24. The electronic components can be connected to each of the motors 60, 74 and the sensor assemblies 16, 24 through electrical connectors (not shown). In addition, the electronics box 38 can be substantially sealed to waterproof the electronic components. Furthermore, in some embodiments, the power sources can be rechargeable, for example through a separate charging station.

In some embodiments, the second sensor assembly 24 can be housed within the electronics box 38. For example, in one embodiment, the second sensor assembly 24 can include a camera. An underside of the electronics box 38 can include a clear window 105 positioned relative to a through-hole 107 in the chassis 28, as shown in FIG. 4. The camera of the second sensor assembly 24 can be arranged to face downward to capture images of the pool floor (i.e., ground surface) through the window and the chassis through-hole in order to provide visual odometry data to the controller 14, as further described below. In addition, in some embodiments, the laser range finder 16 can be housed within the sensor box 40. A clear lid 106 can be coupled to the sensor box 40 to enclose the laser range finder 16 within the sensor box 40. In some embodiments, the clear lid 106 and the sensor box 40 can be substantially sealed to waterproof the laser range finder 16. In other embodiments, the components of the laser range finder 16 can be substantially waterproof. As shown in FIGS. 2-3, the sensor box 40 can be coupled to and supported by the skimmer assembly 30. More specifically, the sensor box 40 can be positioned adjacent to the nose 102 of the skimmer assembly 30 and the camera 22 can be arranged to face forward in order to provide visual data of features or surfaces in front of the pool cleaner 12.

In some embodiments, the controller 14 can operate the vibration motors 60 and/or the motors 74 of the outlet nozzle assemblies 42 individually based on information received from the sensor assemblies 16, 24. For example, as shown in FIG. 1, the controller 14 can include a processor 98 and a storage medium 100 on which is stored program code. This program code can be executed by the processor 98 to perform various operations including, but not limited to, operating the sensor assemblies 16, 24, retrieving data from the sensor assemblies 16, 24, executing one or more algorithms or processes using the retrieved data, as further described below, operating one or more of the motors 60, 74 based on the executed algorithms, and/or storing environment maps and operating routes. For example, as further described below with respect to FIGS. 5-12, the controller 14 can execute one or more distance-measuring algorithms based on data retrieved by the laser range finder 16 to determine a distance between the pool cleaner 12 and features or objects, such as pool walls, in front of the pool cleaner 12. In addition, as further described below with respect to FIGS. 13-16, the controller 14 can execute one or more localization and mapping algorithms based on data retrieved by the laser range finder 16 and the second sensor assembly 24 to map a surrounding environment of the pool cleaner 12 (i.e., the swimming pool) and track the pool cleaner's position within the environment.

With reference to distance measuring methods of some embodiments of the present invention, as described above and illustrated in FIG. 1, the laser range finder 16 can include the first laser 18, the second laser 20, and the camera 22. In some embodiments, the components 18-22 can be arranged as shown in FIG. 5. More specifically, the first laser 18 and the second laser 20 can be laser line generators vertically mounted on top of each other and parallel to a viewing axis of the camera 22 (e.g., a color charge-couple device (CCD) camera). In other words, the lasers 18, 20 can be mounted so that their generated laser lines are parallel to the horizontal axis of the camera's focal plane. The result of the layout illustrated in FIG. 5 is a pair of horizontal lines 110, 114, generated by the lasers 18, 20, configured to be running across the frame captured by the camera 22. In one embodiment, the lasers 18, 20, can be green laser beam generators that each generate a 532-nanometer wavelength laser with a 60-degree fan angle. Though red lasers can be used in some embodiments, green light may be more suitable for underwater applications because water absorbs approximately fifty times more of red light than it does green light.

Figure 6A:
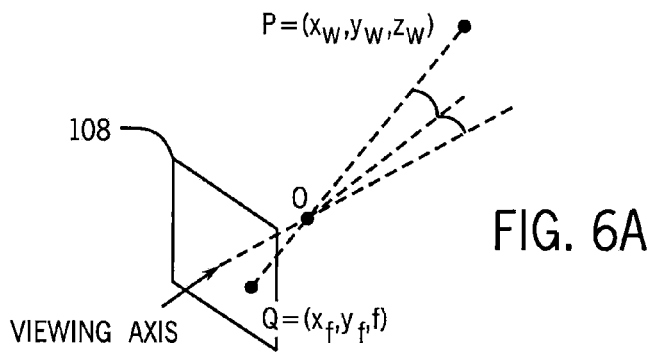
FIGS. 6A and 6B are schematic views of a traditional pinhole camera model and a modified pinhole camera model, respectively.

As described above, generally, the controller 14 can operate the lasers 18, 20 and the camera 22 and can determine distances between the camera 22 (and thus, the front of the pool cleaner 12) and objects in front of the pool cleaner 12, such as walls of the swimming pool or spa environment, based on output from the camera 22. For example, in some embodiments, the controller 14 can perform distance calculations based on a modified pinhole camera model. More specifically, according to a traditional pinhole model, as shown in FIG. 6A, any point in the world, $P=x_w, y_w, z_w$, seen by a camera whose aperture, O, is located at O=0, 0, 0, is projected onto the camera's focal plane 108 at $Q=-x_f, -y_f, f$. The relationship between P and Q can be described by $$\frac{x_w}{z_w} = -\frac{x_f}{f}, \frac{y_w}{z_w} = -\frac{y_f}{f}, \qquad \text{Eq. 1}$$

where $x_w$, $y_w$, and $z_w$ are the components of P corresponding to the point in world coordinates and $x_f$, $y_f$, and f are the corresponding components of Q corresponding to the P's projection on the camera's focal plane. The negative signs in the projected point, Q, are a consequence of the camera's focal plane 108 being located behind the aperture, O, as shown in FIG. 6A.

Figure 6B:
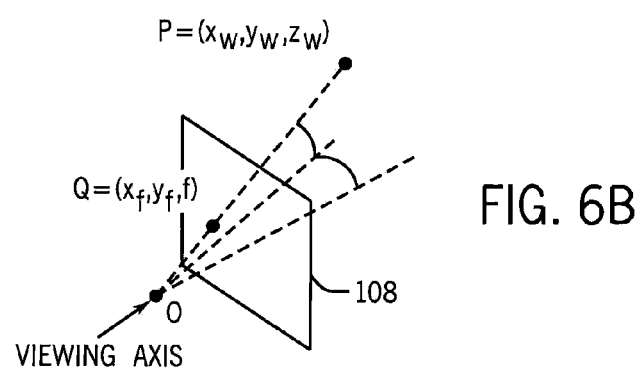

In order to remove confusion caused by the negative signs, a modified version of the pinhole model can be used in some embodiments. More specifically, by moving the focal plane 108 in front of the camera's aperture O, as shown in FIG. 6B, the signs of the X and Y components of an object projected onto the focal plane (at Q) match those of the object's real world coordinates (at P). From the modified pinhole model, the relationship between the object in the world coordinate frame and the camera coordinate frame can be described by $$\frac{x_w}{Z} = \frac{x_f}{f}, \frac{y_w}{Z} = \frac{y_f}{f}, \qquad \text{Eq. 2}$$

where the corresponding components of P and Q, described above, define the relationship.

Figure 7:
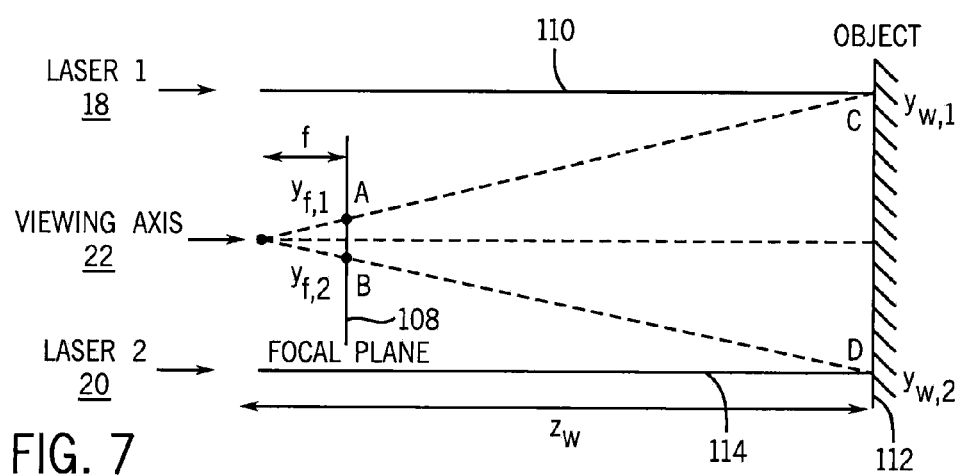
FIG. 7 is a side schematic view of the laser range finder of FIG. 5.

Based on the physical layout of the sensor assembly 16, as shown in FIG. 5, along with the modified pinhole camera model, a side view of the laser range finder 16 is illustrated in FIG. 7. More specifically, FIG. 7 illustrates the first laser 18 projecting a laser line 110 on an object 112 (at point C or $y_{w,1}$), the second laser 20 projecting a laser line 112 on the object 112 (at point D or $y_{w,2}$), and the aperture O of the camera 22. As shown in FIG. 7, two similar triangles can be created between the camera aperture O and the object 112 (triangle OCD), and between the camera aperture O and the object's projection on the focal plane 108 (triangle OAB). By equating the two triangles, the relationship between the world coordinates of the object 112 and the location of the laser lines on the captured image (at points A and B or $y_{f,1}$ and $y_{f,2}$, respectively) can be given as $$\frac{\tilde{y}_w}{z_w} = \frac{\tilde{y}_f}{f}, \qquad \text{Eq. 3}$$

where $\tilde{y}_w \triangleq y_{w,1} - y_{w,2}$ is the physical distance between the laser line generators 18, 20, $\tilde{y}_f \triangleq y_{f,1} - y_{f,2}$ is the distance between the laser lines in the image, $z_w$ is the distance between the camera's aperture O and the object 112, and f is the focal length of the camera 22. Since $\tilde{y}_w$ can be known or predetermined from the physical setup of the laser range finder 16, f can be known or determined as a characteristic of the camera 22 being used, and $\tilde{y}_f$ can be found through an image processing algorithm, described below, the distance to the object 112 can be calculated as $$z_w = \tilde{y}_w\left(\frac{f}{\tilde{y}_f}\right). \qquad \text{Eq. 4}$$

Therefore, in order to determine how far away an object 112 is from the laser range finder 16 (in particular, the camera 22), that is, the distance $z_w$, the distance $\tilde{y}_f$ between the two laser lines A, B in the image frame 108 can be determined and applied to Equation 4 above along with the known focal length f and physical distance between lasers $\tilde{y}_w$. According to some embodiments of the invention, as shown in FIG. 8, a process 116 is provided to extract laser lines from an image and then calculate the distance ($z_w$) to the object based on their spacing ($\tilde{y}_f$) in the image.

Figure 8:
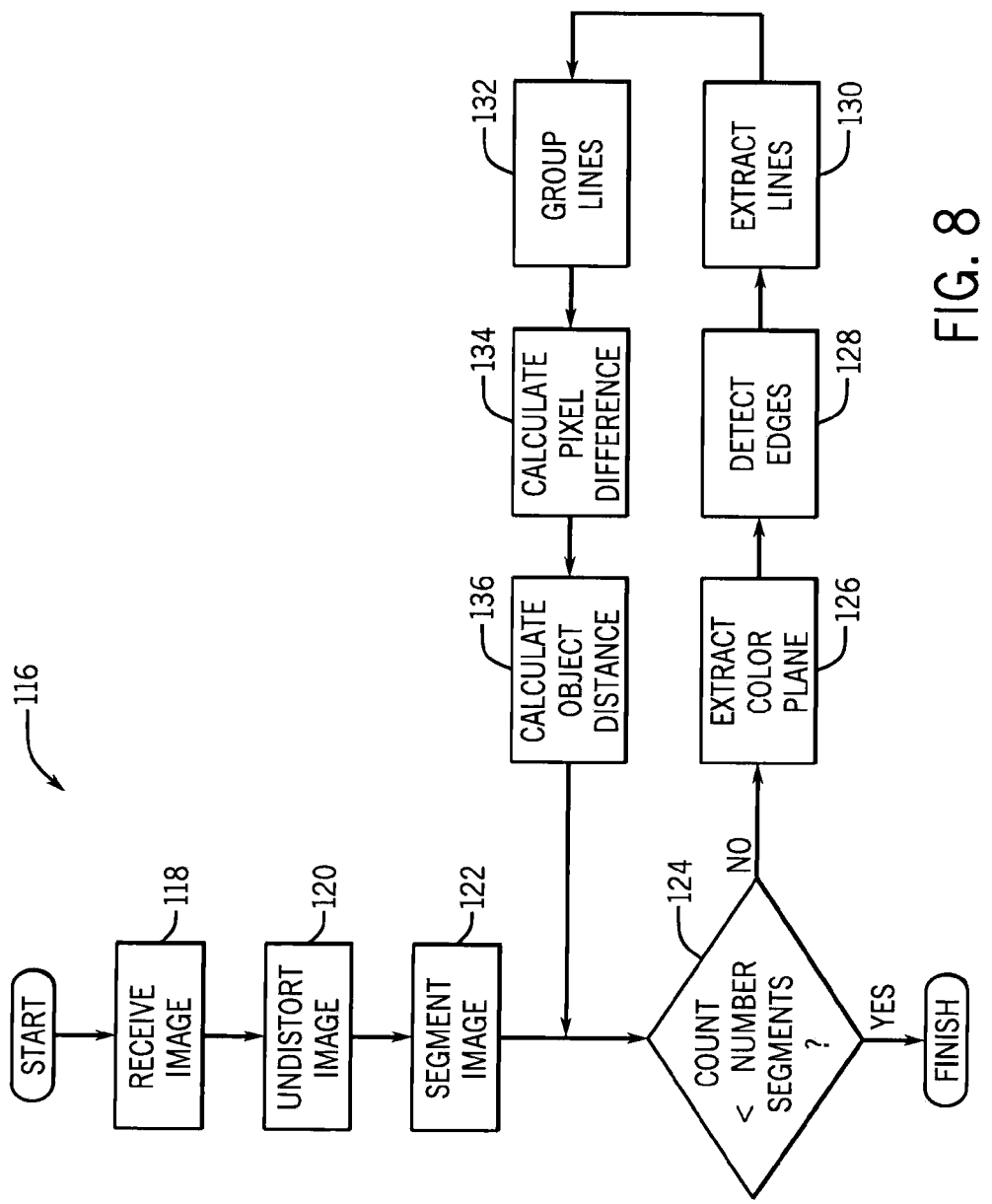
FIG. 8 is a process, according to one embodiment of the invention, for determining distance measurements using the control system of FIG. 1.

In some embodiments, the process 116 of FIG. 8 can be executed by the controller 14. For example, the controller 14 can receive an image at process block 118. The controller 14 can then initially process the image to remove distortion at process block 120 and the image can then be segmented into a number of image segments at process block 122. The controller 14 can then execute a loop for each of the image segments. This loop begins at process block 124, where the controller can determine whether a number of processed segments ("count") is less than the total number of image segments (i.e., the controller 14 can determine whether all images segments have been processed). If not all of the image segments have been processed, the controller 14 can retrieve a particular (unprocessed) image segment and extract color planes from the image (at process block 126), detect edges within the image (at process block 128), and extract laser lines (at process block 130). The controller 14 can then group the extracted lines at process block 132 and calculate pixel differences between the lines at process block 134. Following this calculation, the controller 14 can calculate physical object distance at process block 136. The controller 14 can continue to loop through process blocks 126-136 until the processed image segment count is no longer less than the total number of image segments (i.e., all image segments have been processed), as determined at process block 124. Once this determination is made, the process 116 is completed.

More specifically, with further reference to process block 120, lens distortion can be removed from the received image. Generally, most cameras suffer from distortion from the lens and other manufacturing defects. For example, a model for camera distortion can include two different types of distortions existing in cameras: radial distortion and tangential distortion. Radial distortion can be described as $$x_{corrected,radial} \triangleq x(1+k_1r^2+k_2r^4+k_3r^6), \qquad \text{Eq. 5}$$

$$y_{corrected,radial} \triangleq x(1+k_1r^2+k_2r^4+k_3r^6), \qquad \text{Eq. 6}$$

where x and y are the corresponding horizontal and vertical distances from the center of the camera aperture for a point in the image, $r \triangleq \sqrt{x^2+y^2}$ is the distance of the point from the center of the camera's aperture, and the constants $k_i>0$, i=1, 2,3, are unique constants describing the radial distortion for a given camera.

Tangential distortion can be described as $$x_{corrected,tangential} \triangleq x+[2p_1y+p_2(r^2+2x^2)], \qquad \text{Eq. 7}$$

$$y_{corrected,tangential} \triangleq y+[p_1(r^2+2y^2)+2p_2x], \qquad \text{Eq. 8}$$

where constants $p_i>0$, i=1, 2, are camera specific constants that describe the tangential distortion.

Removing distortion from an image can be achieved by determining the two sets of distortion constants, $k_i$, i=1, 2, 3, and $p_i$, i=1, 2. In some embodiments, this can be a one-time operation performed for the camera 22. By way of example, a camera calibration method, such as the Camera Calibration Toolbox for Matlab® or a similar implementation, can be used to determine the constants. The calibration method can examine a set of images of a standard checkerboard training pattern that is placed around the working space of the camera 22 (e.g., in an underwater environment). Since the dimensions and layout of the testing pattern are known, this information can be used in Equations 5-8 to solve for the camera's distortion constants. In some embodiments, along with finding the distortion parameters, the camera calibration method can also determine the focal length f of the camera 22 and the location of the center point O of the aperture in the image. With the distortion removed at process block 120, the image can be assumed to substantially match that of an ideal pinhole camera model and the process can proceed to process block 122.

Figure 9:
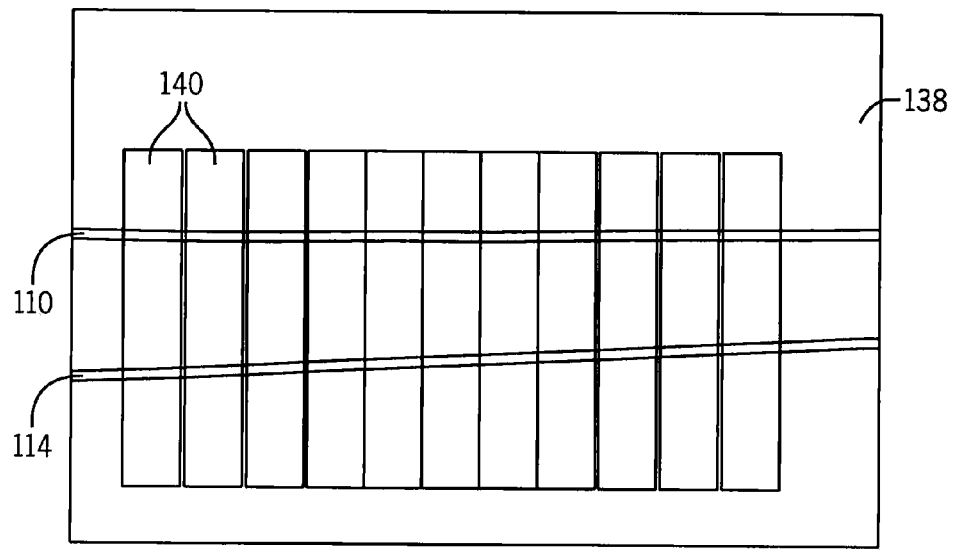
FIG. 9 is an illustration of a captured image divided into image segments in accordance with the process of FIG. 8.

With further reference to process block 122, generally, by projecting a line across the image (i.e., via the laser line generators 18, 20), the distance to an object can be determined at multiple points along the projected lines, as opposed to at a single point which occurs when using just a single point generated by a laser pointer. This ability to determine the distance to multiple objects or multiple locations on a single object can aid the control system's ability to better map the surrounding environment, as further described below. In order to determine the distance at multiple locations, the image can be broken down into multiple segments, for example as shown in FIG. 9. An advantage of segmenting the image, besides providing the ability to map multiple distances, is that image processing (e.g., process blocks 126-136) can be executed on smaller images as opposed to the entire large image. This can provide a computational advantage in that processing time is shortened compared to the time that would be required to process the entire image. In one embodiment, as shown in FIG. 9, the image 138, including laser lines 110, 114, can be separated into 7 image segments 140 that are each 50 pixels wide with an angular offset of 4 degrees.

Figure 10A:
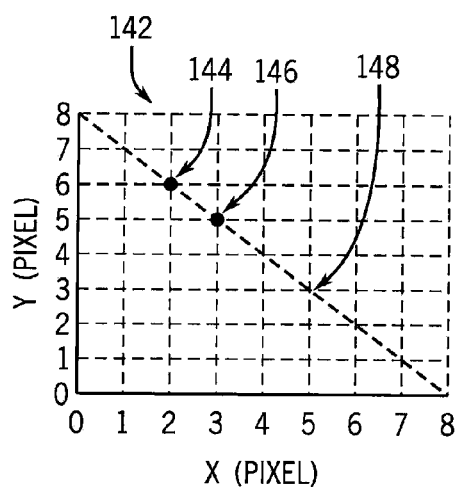
FIGS. 10A and 10B are graphical views of an x-y coordinate system and an m-b coordinate system for use with the process of FIG. 8.
Figure 10B:
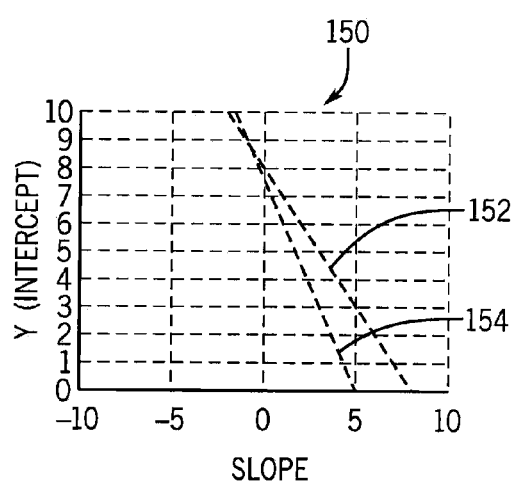

Following process block 122, with the image broken down into smaller segments, each segment can then be processed to extract the location of the laser lines (110, 114) in the image. First, the image can be converted from a full color image to a black and white or grayscale image (i.e., by extracting color planes at process block 126). Second, a threshold can be applied in order to extract the brightest portion of the image and an edge detection algorithm can be used to extract edges that could be lines at process block 128. Third, all of the line segments can be extracted from the image, for example, using the Hough Transform at process block 130. More specifically, the Hough Transform can take as an input an image that has been processed by the edge detection algorithm. Each point in the image, located at (x, y), that is a member of an extracted edge can be represented in slope-intercept form, $$y=mx+b, \qquad \text{Eq. 9}$$

where m is the slope of a given line and b is the point where the line intercepts the vertical axis. Any point in the x-y coordinate system can be represented as a line in the m-b coordinate system, as shown in FIGS. 10A and 10B. By examining any two points in the m-b coordinate system, if their respective lines intersect, they lie on the same line segment in the x-y coordinate system. By way of example, FIG. 10A illustrates an x-y coordinate system 142 with a first point 144 at coordinates (2,6) and a second point 146 at coordinates (3, 5) along a line 148. FIG. 10B illustrates an m-b coordinate system 150 with a first line 152 representing point 144 (defined as 6=m(2)+b) and a second line 154 representing point 146 (defined as 5=m(3)+b). By determining that the first line 152 and the second line 154 intersect in the m-b coordinate system 150, they can be considered to lie on the same line segment (i.e., line 148) in the x-y coordinate system 142.

Example results after each of process blocks 126, 128, 130 are illustrated in FIGS. 11A-11D. In particular, FIG. 11A illustrates an original image segment 138, FIG. 11B illustrates the image segment 138 after it has been converted from the full color space to the grey scale color space (at process block 126), FIG. 11C illustrates the image segment 138 after the threshold has been applied to extract the brightest image components (at process block 128), and FIG. 11D illustrates the image segment 138 with line segments extracted by the Hough Transform line identification (at process block 130).

Once all of the line segments have been extracted from the image segment at process block 130, there is a chance that multiple line segments are used to represent each laser line. As a result, each of the line segments can be grouped together based on a predefined pixel separation parameter (e.g., a user-defined or preprogrammed parameter) at process block 132. This grouping step can analyze each of the extracted line segments and, if certain line segments fall within some p pixel distance of each other, these line segments can be assumed to represent the same laser line. Once the line segments corresponding to each laser line are grouped together at process block 132, each line segment can be evaluated at the midpoint of the image segment and can be averaged to estimate the exact middle of the laser line in the frame. The pixel difference between the two laser lines can be calculated, at process block 134, based on these averages so that the physical distance to the object at the center of the image segment can be calculated at process block 136, for example using Equation 4 above.

Based on experimental results, the above control system 10 and process 116 can be capable of providing underwater distance measurements with a maximum absolute error of about 10% of the actual distance, which can be considered accurate enough for beneficial use in autonomous pool cleaner applications. In addition, the use of laser lines as opposed to traditional laser points allows the control system 10 to obtain additional data besides a single distance measurement to an object directly in front of the sensor assembly. For example, when corners or obstacles that are not flat and perpendicular to the camera's viewing axis are encountered, the control system 10 can be capable of obtaining shape data from a single image. FIGS. 12A and 12B illustrate distance measurements experimentally obtained from the laser range finder 16 of the present invention in comparison to a traditional LiDAR sensor assembly when each assembly is facing a corner (wherein LiDAR data is represented a solid line 156 and the laser range finder 16 data is represented by points 158). As shown in FIGS. 12A and 12B, due to the camera's viewing angle 160, the laser range finder 16 is able to capture the entire corner in a single image. An algorithm for determining the corner as a feature of the environment is further described below. As a result of the above-described segment processing, multiple accurate distance measurements 158 about the corner can be obtained. Furthermore, use of the dual-plane laser range finder 16 of the present invention can provide a low-cost, distance measuring system 10, in comparison to traditional LiDAR systems, and can also provide a system 10 capable of accurately measuring distances in light or dark, enclosed, underwater spaces, in comparison to other single-laser applications, SONAR applications, and GPS applications.

As described above, the control system 10 can use output from the laser range finder 16 to control movement of the pool cleaner 12. In some embodiments, the control system 10 can be configured to use the laser range finder 16 as an obstacle or feature finder, thereby controlling turning movement of the pool cleaner 12 when a detected obstacle or feature is a certain distance directly in front of the pool cleaner 12. In some embodiments, the control system 10 can be configured to map an environment (i.e., swimming pool, spa, etc.) in which the pool cleaner 12 is placed and learn about the pool cleaner's surroundings using Simultaneous Localization and Mapping (SLAM) techniques, based on output from the laser range finder 16 and the second sensor assembly 24 (i.e., without previous environment-related calibrations or teaching). In this manner, the control system 10 can determine and optimize cleaning routes and can operate the pool cleaner 12 to follow these optimized cleaning routes (e.g., to traverse an entire swimming pool floor within a certain time period). In addition, the control system 10 can track cleaner movement in order to track routes of cleared debris and ensure that the entire swimming pool floor has been traversed within a certain time period). In some embodiments, a feature-based Extended Kalman Filter (EKF) SLAM technique can be used by the control system 10, as described below. In other embodiments, other SLAM techniques can be used.

Generally, in order for robotic vehicles to be able to autonomously perform tasks in any environment, they must be able to determine their location as well as locate and remember the location of obstacles and objects of interest in that environment or, in other words, they must be capable of SLAM. An Extended Kalman Filter (EKF) can be used to estimate the SLAM posterior. The following paragraphs provide an overview of an EKF SLAM approach, in accordance with some embodiments of the invention.

In a probabilistic sense, the goal of SLAM is to estimate the posterior of the current pose of the pool cleaner 12 along with the map of the surrounding environment, denoted by $$p(x_t, m | z_{1:t}, u_{1:t}),$$  Eq. 10 where $x_t$ is the pose of the pool cleaner 12 at time t, m is the map, $z_{1:t}$ are the measurements, and $u_{1:t}$ are the control inputs. The EKF can assume that state transition and measurement models are defined as $$x_t = g(u_t, x_{t-1}) + \eta_{x,t}, t=1,2\ldots,$$  Eq. 11

$$z_t = h(x_t) + \eta_{z,t},$$  Eq. 12 where $g(\cdot)$ and $h(\cdot)$ are nonlinear and the additive noise, $\eta_{x,t}$ and $\eta_{z,t}$, are zero mean gaussian processes with covariances of $R_t$ and $Q_t$ respectively. The EKF solution to SLAM falls into a class of solutions referred to as feature-based approaches. In feature-based SLAM, it is assumed that the environment that surrounds the pool cleaner 12 can be represented by a set of distinct points that are referred to as features. As a result, the full SLAM state is composed of the state of the cleaner 12 and the state of the map $$x_t \triangleq [x y \theta M_x^1 M_y^1 \ldots M_x^N M_y^N]^T,$$  Eq. 13 where x and y are the location of the cleaner 12 in the two-dimensional (2D) plane and θ is the heading. The map is represented by N features with the location of each feature in the 2D plane maintained in the state, $M_x^i$ and $M_y^i$.

The EKF solution to SLAM can use a classic prediction-correction model. More specifically, the prediction step of the EKF is based on the state transition model of the system given by Equation 11 above and can be defined as $$x_{t-1} = g(u_t, x_{t-1}),\qquad\text{Eq. 14}$$

$$\overline{\Sigma}_t = G_t \Sigma_{t-1} G_t^T + R_t,\qquad\text{Eq. 15}$$

where $x_{t-1}$ is the state estimate from the previous time step, $\overline{x}_{t-1}$ is the prediction of the full SLAM state at the current time step, $\Sigma_{t-1}$ is the covariance estimate at the previous time step, $\overline{\Sigma}_t$ is the prediction of the covariance at the current time step, and $G_t$ is the Jacobian of g(•) with respect to $x_{t-1}$ evaluated at $u_t$ and $x_{t-1}$. The correction step comes from the measurement model given by Equation 12 above and can be defined as $$K_t = \overline{\Sigma}_t H_t^T (G \overline{\Sigma}_t H_t^T + Q_t)^{-1}\qquad\text{Eq. 16}$$

$$x_t = \overline{x}_t + K_t(z_t - h(\overline{x}_t)),\qquad\text{Eq. 17}$$

$$\Sigma_t = (I - K_t H_t) \overline{\Sigma}_t,\qquad\text{Eq. 18}$$

where $H_t$ is the Jacobian of h(•) with respect to $x_{t-1}$ evaluated at $\overline{x}_{t-1}$ and $z_t$ is the measurement at the current time.

The present EKF SLAM technique of some embodiments can include an additional step that is not present in the standard EKF, which is related to the addition of new features to the SLAM state. For example, when a new feature is encountered, it must be integrated into both the full SLAM state, $x_t$, and the SLAM covariance $\Sigma_t$. The augmentation of the SLAM state can be defined by $$x_t^+ \triangleq \begin{bmatrix} x_t \\ f(x_t, z_t) \end{bmatrix},\qquad\text{Eq. 19}$$

where $x_t^+$ is the SLAM state after the addition of the new features and f(•) estimates the location of the new feature in the global frame based on the current cleaner state and the observation of the feature.

With respect to the augmentation of the SLAM covariance, an examination of the SLAM covariance shows that it takes the form $$\Sigma_t = \begin{bmatrix} \Sigma_{t,v} & \Sigma_{t,vm} \\ \Sigma_{t,vm}^T & \Sigma_{t,m} \end{bmatrix},\qquad\text{Eq. 20}$$

where $\Sigma_{t,v}$ is the covariance of the cleaner estimate, $\Sigma_{t,vm}$ is the covariance between the cleaner estimate and map estimate, and $\Sigma_{t,m}$ is the covariance of the map estimate. From Bailey, et al. ("Simultaneous localization and mapping (slam): Part ii". *Robotics & Automation Magazine, IEEE*, 13(3), pp. 108-117), the augmented form of the SLAM covariance can be calculated as $$\Sigma_t^+ = \begin{bmatrix} \Sigma_{t,v} & \Sigma_{t,vm} & \Sigma_{t,v}^T F_{t,x}^T \\ \Sigma_{t,vm}^T & \Sigma_{t,m} F_{t,x} & \Sigma_{t,vm}^T F_{t,x}^T \\ F_{t,x} \Sigma_{t,v} & F_{t,x} \Sigma_{t,vm} & F_{t,x} \Sigma_{t,v} F_{t,x}^T + F_{t,z} R_t F_{t,z}^T \end{bmatrix},\qquad\text{Eq. 21}$$

where $\Sigma_t^+$ is the augmented SLAM covariance, $F_{t,x}$ is the Jacobian of f(•) with respect to $x_t$ evaluated at $x_t$ and $z_t$, and $F_{t,z}$ is the Jacobian of f(•) with respect to $z_t$ calculated at $x_t$ and $z_t$.

With reference to the control system 10 of embodiments of the present invention, the sensor assemblies 16, 24 can provide data that represent the above-described state transition model input $u_t$ and the feature measurements $z_t$. Traditionally, for ground vehicle applications, the inputs for the state transition model are composed of odometry readings from wheel encoders while the location of features are calculated using Light Detection and Ranging (LiDAR). However, these types of sensors are unable to function in underwater environments. In typical underwater environments, many existing sensor technologies are based on acoustics, where odometry data is provided to the vehicle from a doppler velocity log (DVL) and features are located using SONAR sensors. However, as described above, acoustic-based sensors are problematic due to the large number of multiple returns that could be generated in relatively small, enclosed environments such as swimming pools and spas. Additionally, there are sensor specific issues that arise from currently available sensors. For example, as described above, the pool cleaner 12 can operate directly on, or very close to, the pool floor. In such an operating environment, DVL sensors suffer from poor performance and they also have a large size and high price that make their use on small inexpensive underwater vehicles prohibitive. Furthermore, a problem with SONAR sensors is that they are difficult to use for feature extraction when implementing feature-based SLAM methods. More specifically, a SONAR can only report that there exists an object located at some distance in front of the SONAR sensor's scanning cone, which makes it difficult to identify unique features that can be used to generate a map in feature-based SLAM. As a result, the feature must be observed from multiple locations before proper data association can occur. The control system 10 of the present invention, based on computer vision algorithms and the above-described sensor assemblies 16, 24, can overcome the above issues and can determine control inputs to the state transition model as well as valid landmark measurements in an enclosed underwater environment, as further described below.

Figure 13:
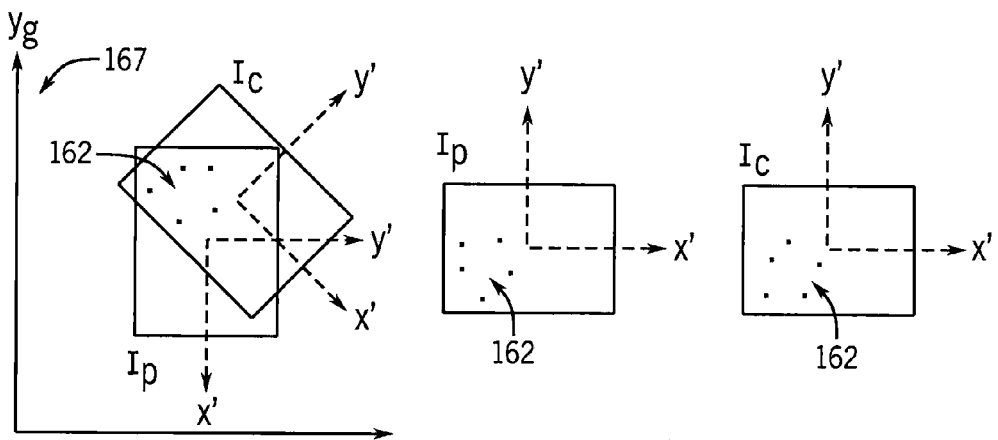
FIG. 13 is a graphical view of determined pool cleaner locations in multiple image frames.

With respect to the second sensor assembly 24, visual odometry data can be calculated from the downward facing camera by tracking a set of points between consecutive images acquired by the camera. From the translation and rotation of the points between frames, the change in the cleaner orientation can be determined (therefore providing the state transition model inputs). By way of example, with reference to FIG. 13, two images are compared to determine the change of orientation of the cleaner 12 (i.e., the current image $I_C$ and the previous image $I_P$, illustrated relative to a global reference frame 167). One approach for selecting points to track between frames is to randomly select points from the image (such as points 162 in FIG. 13). However, the resulting points that are selected can be difficult to uniquely identify, thus tracking the points becomes quite difficult. In order to alleviate this problem, in accordance with some embodiments, the opensource image processing library OpenCV can be used with its built-in function, GoodFeaturesToTrack. The GoodFeaturesToTrack function selects corners in the image as features that can be easily identified and tracked. In one embodiment, the corners can be calculated based on the method by Shi and Tomasi ("Good features to track". In Computer Vision and Pattern Recognition, 1994. Proceedings CVPR '94., 1994 IEEE Computer Society Conference, pp. 593-600), which first computes the Hessian matrix around a point using Sobel operators to calculate the second derivatives. The minimum of the two eigen-values of the Hessian are then compared and, if it is above a preset minimum threshold, the point is selected as a valid corner. With a set of trackable points selected, the change in location between the frames, as shown in FIG. 13, can be calculated by tracking the points from $I_P$ to $I_C$.

To track the points between frames, a multi-step algorithm can be used. First, $I_P$ can be filtered, for example using a Laplacian filter with a kernel size of 7. The filtered images can be used for tracking as opposed to the raw images in order to account for changes in lighting conditions between the two frames (e.g., in order to prevent degradation of tracking performance due to changes in shadow or brightness).

After filtering $I_p$, the GoodFeaturesToTrack function can be executed on the image to calculate the set of points to track between frames. $I_c$ can then be filtered using the same method used on $I_p$. Each of the selected points from $I_p$ can then be found in $I_c$ using a cross correlation technique, such as that described by Nourani-vatani, et al. ("Correlation-Based Visual Odometry for Ground Vehicles". Journal of Field Robotics, 28(5), pp. 742-768). For example, a window containing a point is selected from $I_p$ and cross correlation can be performed between the point window and $I_c$. The location of the maximum of the cross correlation corresponds to the location of the point in $I_c$. The relationship between a point in $I_p$ and $I_c$ can be determined using a linearized version of the 2D homogeneous transformation equation and the small angle approximation:

$$\begin{bmatrix} 1 & \delta\theta & \delta x \\ -\delta\theta & 1 & \delta y \\ 0 & 0 & 1 \end{bmatrix} \begin{bmatrix} x_p \\ y_p \\ 1 \end{bmatrix} = \begin{bmatrix} x_c \\ y_c \\ 1 \end{bmatrix}, \quad \text{Eq. 22}$$

where $x_p$, $y_p$, $x_c$ and $y_c$ are the x and y locations of the point in $I_p$ and $I_c$, respectively and $\delta x$, $\delta y$ and $\delta\theta$ are the components of the change and orientation of the cleaner in the camera's frame of reference. Rearranging Equation 22 yields $$y_p \delta\theta + \delta x = x_c - x_p, \quad \text{Eq. 23}$$

$$-x_p \delta\theta + \delta y = y_c - y_p, \quad \text{Eq. 24}$$

which can be combined for all the points being tracked as $$\begin{bmatrix} 1 & 0 & y_{p,1} \\ 0 & 1 & -x_{p,1} \\ \vdots & \vdots & \vdots \\ 1 & 0 & y_{p,i} \\ 0 & 1 & -x_{p,i} \\ \vdots & \vdots & \vdots \\ 1 & 0 & y_{p,M} \\ 0 & 1 & -x_{p,M} \end{bmatrix} \begin{bmatrix} \delta x \\ \delta y \\ \delta\theta \end{bmatrix} = \begin{bmatrix} x_{c,1} - x_{p,1} \\ y_{c,1} - x_{p,1} \\ \vdots \\ x_{c,i} - x_{p,i} \\ y_{c,i} - y_{p,i} \\ \vdots \\ x_{c,M} - x_{p,M} \\ y_{c,M} - y_{p,M} \end{bmatrix}, \quad \text{Eq. 25}$$

where i=1, 2, . . . , M and M is the number of points being tracked. The resulting change in orientation can be found by calculating the pseudoinverse using the SVD algorithm. The change in orientation $\delta x$, $\delta y$ and $\delta\theta$ can then be transformed from pixels to world units by using a calibration constant previously determined from running a calibration algorithm.

Figure 14:
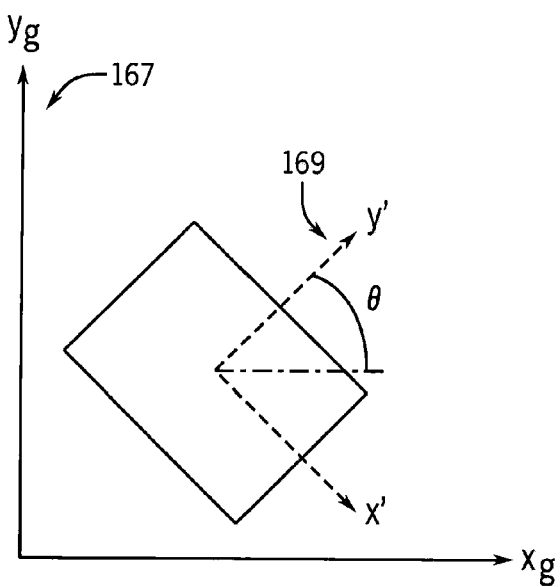
FIG. 14 is a graphical view of reference frames for use with odometry data, in accordance with methods of the present invention.
Figure 15:
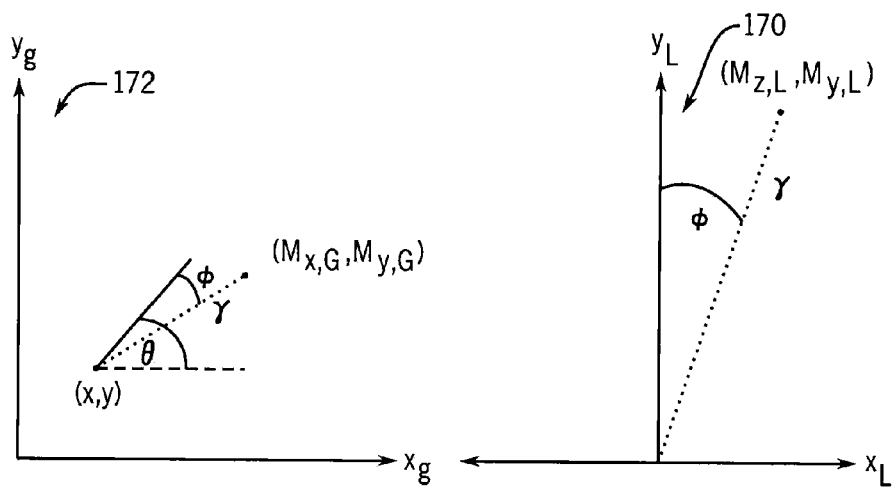
FIG. 15 is a graphical view of reference frames for use with distance data, in accordance with methods of the present invention.

There are two reference frames that can be taken into account in the development of the state transition model: the vehicle reference frame 169, where the odometry data is collected, and the global reference frame 167, in which the cleaner 12 operates, both of which are illustrated in FIG. 14 (wherein the global reference frame 167 is represented by $y_g$ and $x_g$ and the vehicle reference frame 169 is represented by y' and x'). The rotation of the visual odometry data from the camera frame to the global frame, from geometry, can be defined as $$\Delta x = \Delta y' \cos(\theta) + \Delta x' \sin(\theta), \quad \text{Eq. 26}$$

$$\Delta y = \Delta y' \sin(\theta) - \Delta x' \cos(\theta), \quad \text{Eq. 27}$$

where $\Delta x$ and $\Delta y$ are the translation of the cleaner in the global frame and $\Delta x'$ and $\Delta y'$ are the translation in the vehicle frame. The resulting state transition matrix is defined as $$x_t = x_{t-1} + \Delta y' \cos(\theta) + \Delta x' \sin(\theta), \quad \text{Eq. 28}$$

$$y_t = +\Delta y' \sin(\theta) - \Delta x' \cos(\theta), \quad \text{Eq. 29}$$

$$\theta_t = \theta_{t,m}, \quad \text{Eq. 30}$$

where $\theta_{t,m}$ is a measurement from a compass. The resulting control input vector $u_t \triangleq [\Delta x' \ \Delta y' \ \theta_{t,m}]^T$ is a noisy measurement. To fit the form required by the EKF, an assumption can be made that the sensor noise is a zero mean gaussian process with covariance $M_t$. The resulting state transition model of the system can be defined as $$\begin{bmatrix} x_t \\ y_t \\ \theta_t \end{bmatrix} = \underbrace{\begin{bmatrix} x_{t-1} \\ y_{t-1} \\ 0 \end{bmatrix} + \begin{bmatrix} \Delta y' \cos(\theta) + \Delta x' \sin(\theta) \\ \Delta y' \sin(\theta) - \Delta x' \cos(\theta) \\ \theta_{t,m} \end{bmatrix}}_{g(\cdot)}, \quad \text{Eq. 31}$$

which has covariance $R_t = V_t M_t V_t^T$ where $V_t$ is the Jacobian of $g(\bullet)$ with respect to $u_t$ evaluated at $x_{t-1}$ and $u_t$. Thus, using the above methods, odometry data from the second sensor assembly 24 can be used to determine the state transition model inputs.

With respect to the laser range finder 16, shape information can be determined, thus allowing for feature detection. The determined range and relative heading to the feature can be used to determine the measurement model for the EKF SLAM (i.e., feature measurements). There are two frames of reference in which the laser range finder 16 works, as shown in FIGS. 15A-15B: the laser range finder's local frame 170 and the global frame 172 that the cleaner 12 operates in. In the laser range finder's local frame of reference 170, the distance and relative heading to a feature can be defined as $$r = \sqrt{M_{x,L}^2 + M_{y,L}^2}, \quad \text{Eq. 32}$$

$$\phi = a\tan 2(M_{x,L}, M_{y,L}), \quad \text{Eq. 33}$$

where $\phi$ is the relative heading to the feature, r is the distance to the feature, and $M_{x,L}$ and $M_{y,L}$ are the coordinates of the feature in the local frame 170. In the global frame 172, r and $\phi$ can be defined as $$r = \sqrt{(M_{y,G} - y)^2 + (M_{x,G} - x)^2}, \quad \text{Eq. 34}$$

$$\phi = \theta - a\tan 2(M_{y,G} - y, M_{x,G} - x), \quad \text{Eq. 35}$$

where $M_{x,G}$ and $M_{y,G}$ are the location of the feature in the global frame 172. The resulting measurement model is $$z = \begin{bmatrix} r \\ \phi \end{bmatrix} += \underbrace{\begin{bmatrix} \sqrt{(M_{y,G} - y)^2 + (M_{x,G} - x)^2} \\ \theta - \text{atan2}(M_{y,G} - y, M_{x,G} - x) \end{bmatrix}}_{h(\cdot)}, \quad \text{Eq. 36}$$

which has zero mean Gaussian additive noise with covariance $Q_t$ which matches the form required by the EKF.

Figure 16:
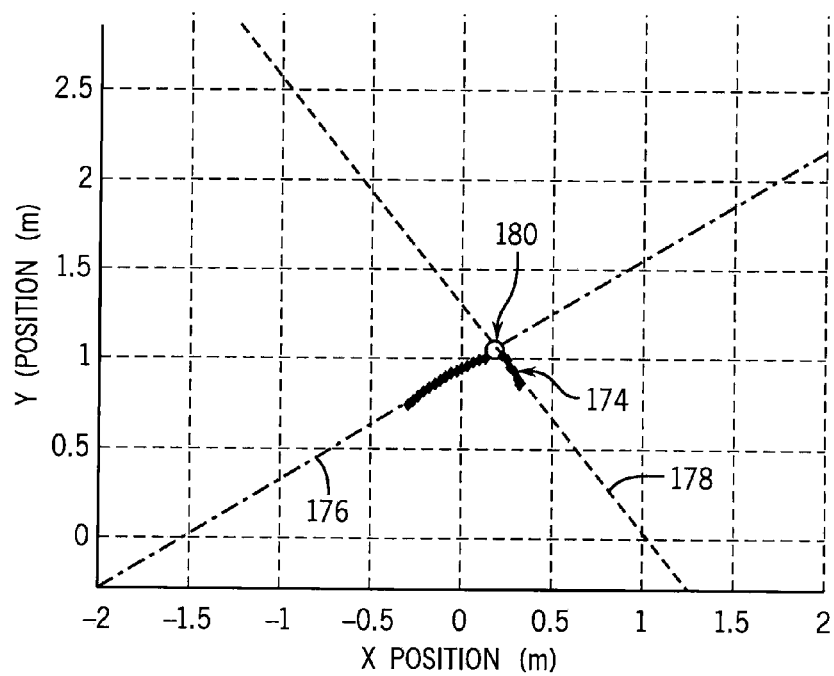
FIG. 16 is a graphical view of a corner feature determination, in accordance with methods of the present invention.

As described above, EKF SLAM is a feature-based technique and, as a result, feature detection is a key aspect in implementing this technique. Based on the sensor assembly 16 used in some embodiments, almost anything in the environment can be used as feature. For example, in indoor environments common features can include walls and corners as these are easy-to-identify static objects. As described above, features such as corners can be extracted from distance measurements of the laser range finder 16. For example, a slightly modified version of a Random Sample Consensus (RANSAC) algorithm for line identification can first be used. The modification made to RANSAC line identification relates to how the random sample set is generated. For example, in a standard RANSAC algorithm, the sample set is composed of random possible inliers that are not already attached to an object model. This can be modified to reduce the misidentification of lines that were not actual walls in the environment. More specifically, in order to overcome this misidentification issue, the sample set can be generated by first selecting a single possible inlier at random and then using all possible inliers that are located within a window around the selected point as the sample set. Following the line identification step, intersections between lines can be found and, if the minimum angle between those lines is greater than a predefined threshold, the intersection can be characterized as a corner. An example of this resulting corner identification is illustrated in FIG. 16, including the laser range finder distance measurements 174, the two extracted lines 176, 178, and the detected corner 180.

Another component of EKF SLAM related to features is referred to as data association, that is, associating an observed feature with itself if it has already been seen, or adding it as a new feature if it has never been seen. In some embodiments, a gated search algorithm can be used. More specifically, for each observation, the predicted location, based on the current estimate of the cleaner state, can be compared to each of the currently tracked features and, if it falls within the gating distance of a currently tracked feature, the observation can be associated with that feature and, if the observation is not associated with any of the tracked features, the observation can be assumed to be a new feature and can be added to the current state estimate. Other, more complex approaches may be used in some embodiments. By continuously or periodically updating the state estimate of the cleaner, and since the state estimate also contains all of the features currently describing the map, those estimates can also be updated, these data association methods can help provide a better estimate of the cleaner's true position and reduce error.

In some embodiments, using the above methods and techniques, the control system 10 can continuously or periodically measure object distances in front of the pool cleaner 12, map the surrounding environment, identify objects within the environment, locate the pool cleaner's position within the environment, and/or navigate the pool cleaner 12 throughout the environment. For example, based on the mapping and localization, the control system 10 can track and control the movement of the pool cleaner 12 to optimize cleaning routes of the pool cleaner 12 throughout the environment. This can include determining and storing a cleaning route and controlling the pool cleaner 12 to following the cleaning route or tracking movement routes of the pool cleaner 12 and periodically adjusting movements of the pool cleaner 12 to ensure all areas of the environment are traversed within a certain time period.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A pool cleaner control system to detect a physical distance to an object in front of the pool cleaner, the control system comprising:
   a laser range finder including a first laser line generator, a second laser line generator, and a camera, the first laser line generator and the second laser line generator positioned to emit parallel laser lines and the camera positioned relative to the first laser line generator and the second laser line generator to capture an image of the laser lines projected on the object; and
   a controller in communication with the laser range finder and configured to
      control operation of the first laser line generator and the second laser line generator to emit the laser lines,
      control the camera to capture the image of the laser lines projected on the object,
      receive the image from the camera,
      calculate a pixel distance between the laser lines in the image, and
      calculate the physical distance between the camera and the object based on the pixel distance.

2. The control system of claim 1, wherein the first laser line generator and the second laser line generator are vertically mounted on top of each other and separated by a vertical distance.

3. The control system of claim 2, wherein the controller is further configured to calculate the physical distance between the camera and the object based on the vertical distance between the first laser line generator and the second laser line generator.

4. The control system of claim 1, wherein the first laser line generator and the second laser line generator are positioned relative to the camera to emit the laser lines parallel to a viewing axis of the camera.

5. The control system of claim 1, wherein the first laser line generator and the second laser line generator are green laser line generators.

6. The control system of claim 1, wherein the first laser line generator and the second laser line generator are positioned relative to the camera to emit the laser lines parallel to a ground surface.

7. The control system of claim 1, wherein the first laser line generator and the second laser line generator each emit the laser lines at an approximate 60-degree fan angle.

8. An autonomous robotic pool cleaner for an underwater environment, the pool cleaner comprising:

a range finder configured to emit first and second lines and detect a projection of the first and second lines on a feature of the environment;

a camera configured to capture images of a floor surface of the environment under the pool cleaner;

a controller in communication with the range finder and the camera, the controller configured to:
- determine a physical distance between the range finder and the feature based on the detected projection of the first and second lines on the feature,
- determine visual odometry data based on the captured images,
- map the environment based on the physical distance and the visual odometry data, and
- track a position of the pool cleaner within the environment.

9. The pool cleaner of claim 8 and further comprising a directional control system in communication with the controller and configured to move the pool cleaner across the floor surface, the controller configured to operate the directional control system to move the pool cleaner based on the mapped environment.

10. The pool cleaner of claim 9, wherein the controller is configured to create a cleaning route of the pool cleaner based on the mapped environment and operate the directional control system to move the pool cleaner along the cleaning route.

11. The pool cleaner of claim 8, wherein detecting a projection of the first and second lines on a feature including capturing an image of the first and second lines projected on the feature, and the controller is configured to determine the physical distance between the range finder and the feature by relating a pixel distance between the first and second lines projected on the feature in the image to the physical distance.

12. The pool cleaner of claim 8, wherein the controller is configured to map the environment using feature-based Extended Kalman Filter Simultaneous Localization and Mapping.

13. A method of determining a distance to an object in an underwater environment using a dual-plane laser range finder, the method comprising the steps of:
- projecting a first line onto the object;
- projecting a second line onto the object parallel to the first line;
- capturing an image of the projected first line and the projected second line on the object;
- segmenting the image into separate image segments;
- for each image segment:
  - extracting color planes in the image segment to obtain a grayscale image segment;
  - detecting potential line edges in the grayscale image segment;
  - extracting line segments using the potential line edges;
  - grouping the line segments to obtain the first projected line and the second projected line in the grayscale image segment;
  - calculating a pixel distance between the first projected line and the second projected line in the grayscale image segment; and
  - calculating the distance to the object based on the pixel distance.

* * * * *